United States Patent

[11] 3,579,098

| [72] | Inventor | Marcel L. Mougne |
| | | Houston, Tex. |
| [21] | Appl. No. | 770,221 |
| [22] | Filed | Oct. 24, 1968 |
| [45] | Patented | May 18, 1971 |
| [73] | Assignee | Dresser Industries, Inc. |
| | | Dallas, Tex. |

[54] METHOD AND COMBINATION WELL-LOGGING APPARATUS FOR CONDUCTING BOTH DEEP AND SHALLOW INVESTIGATION OF THE FORMATIONS SURROUNDING A BOREHOLE
9 Claims, 3 Drawing Figs.

| [52] | U.S. Cl. | 324/10 |
| [51] | Int. Cl. | G01v 3/18 |
| [50] | Field of Search | 324/1 (part), 10 |

[56] References Cited
UNITED STATES PATENTS

| 2,707,768 | 5/1955 | Owen | 324/10X |
| 3,054,046 | 9/1962 | Holmes et al. | 324/10X |
| 3,068,401 | 12/1962 | Janssen | 324/10X |
| 3,075,142 | 1/1963 | Albright et al. | 324/1 |
| 3,132,298 | 5/1964 | Doll et al. | 324/10 |
| 3,227,946 | 1/1966 | Mayes | 324/10 |
| 3,337,794 | 8/1967 | Janssen | 324/10 |
| 3,390,323 | 6/1968 | Kisling | 324/10 |

*Primary Examiner*—Gerard R. Strecker
*Attorneys*—Robert W. Mayer, Daniel Rubin, Peter J. Murphy, Frank S. Troidl, Roy L. Van Winkle and William E. Johnson, Jr.

ABSTRACT: The well-logging instrument comprises, essentially, a focus section have a focus upper guard, a center electrode and lower focus guard. The bottom section of the instrument includes a pad device having a minifocus central button electrode and rings around the central button which serve as microguards. The remote electrode of the focus portion of the instrument is the armor surrounding the logging cable. The lower focus guard serves a dual function in that it is also the minifocus remote electrode. Means are provided for measuring the potential between the focus guard and the cable armor and also between the microguard and the lower focus guard, both measurements then being sent up the logging cable to the surface electronics.

INVENTOR
MARCEL L. MOUGNE

BY William E. Johnson, Jr.

ATTORNEY

Patented May 18, 1971

INVENTOR
MARCEL L. MOUGNE

BY
William E. Johnson Jr.

ATTORNEY

METHOD AND COMBINATION WELL-LOGGING APPARATUS FOR CONDUCTING BOTH DEEP AND SHALLOW INVESTIGATION OF THE FORMATIONS SURROUNDING A BOREHOLE

BACKGROUND OF THE INVENTION

This invention relates generally to methods and apparatus for investigating the characteristics of formations surrounding an earth borehole, and in particular, for simultaneously investigating the shallow and deep formation electrical resistivities.

Focused logging tools are used by those in the well-logging art to determine the true resistivity, $R_t$, of formations wherein very high saline drilling fluids, such as salt muds, are used in the borehole. Other types of resistivity logging devices are not adapted to such conditions because their current is scattered by the conductive drilling fluids, the measurements then being primarily a function of the mud column. With focused logging tools, however, the current is prevented from flowing up or down the mud column so that a thin sheet of current is forced to penetrate the formation parallel to the bedding plane. This is accomplished by placing focusing electrodes on both sides of a centrally located measure electrode. Such focusing electrodes are employed to prevent the measure current from flowing either up or down within the borehole and thereby forcing it to flow only in a lateral direction perpendicular to the axis of the logging device. The ideal and most desired measure current distribution pattern for focused current logging devices would be in the shape of a uniform cylindrical disc. With such an ideal current distribution, the theoretical current intensity as a function of the radial distance into the formation can be calculated. For a uniform disc, the current intensity will vary indirectly with the first power of the radial distance. With such conventional focus logging devices, a current of constant intensity is supplied to the center electrode. A controlled supply of current of the same polarity as is applied to the center electrode is also applied to both guard electrodes. Within the instrument, the upper and lower guard electrodes are connected together so that both electrodes will be at the same potential. The potential of the center electrodes and the potential of the guard electrodes are monitored. The intensity of the controlled current applied to the upper and lower guard electrodes is automatically and continuously adjusted to maintain zero potential difference between the center electrode and the guard electrodes. By continuously maintaining this potential difference at zero, there is no tendency for the current leaving the center electrode to flow in the borehole fluids opposite the guard electrodes. Thus, the measured current is forced to flow in a plane perpendicular to the axis of the logging tool. With such focused logging tools, still another electrode somewhat remote from the guard electrodes is used to measure the drop of potential created by the resistance offered by the flow of the current through the surrounding formation. From a measurement of the potential difference between the guard electrode and the remote electrode, the apparent resistivity can be determined, thus providing a means for relatively deep investigation of the formation.

A shallow investigation tool, known in the art as a minifocused logging instrument, is a focused pad-type device which can be held against the face of the borehole wall. Such a device is used by those in the art to accurately measure the resistivity of a flushed zone, $R_{xo}$, near the borehole wall. As is further known in the art, the resolution of a minifocused logging instrument is extremely fine and the designation of the bed boundaries is quite detailed and accurate. Such a tool often consists of a cylindrical steel housing with spring arms mounted on the instrument to force the pad member extending from the steel housing into contact with the borehole wall. Mounted upon the pad are a small button-type electrode and one or more guard ring electrodes encircling the center electrode. The focusing effects of the shallow investigation pad instrument is accomplished by maintaining a zero potential between the encircling guard rings and the center measure electrode. With such an instrument, the current from the center measure electrode passes out through the formations in a lateral direction and is used, in conjunction with a remote electrode, to measure the potential difference between the pad guard electrodes and the remote reference electrode.

While the logging industry has long used both the focused logging instrument and the minifocused logging instrument, these two instruments have not been used in the same apparatus because of crosstalk and interference problems associated with having two or more remote electrodes on the same cable bridle.

It is therefore the primary object of this invention to provide a new and improved well-logging apparatus having both a focused and a minifocused section for investigating the formations surrounding a borehole;

It is a further object of this invention to provide a method for simultaneously measuring the true resistivity of a formation surrounding a borehole and also the resistivity of a flushed formation adjacent said borehole;

It is another object of the invention to provide means for simultaneously investigating the deep and shallow resistivity characteristics of the formations surrounding a borehole;

It is yet another object of the invention to provide a new and improved well-logging apparatus wherein interference and crosstalk problems are substantially reduced; and It is still another object of the invention to provide a method for simultaneously conducting a pair of focused logging measurements in a borehole.

The objects of the invention are accomplished, broadly, by a well-logging instrument having a pair of focused logging sections, wherein the guard of one focused section is used as the remote electrode for the other focused section.

Other objects, features and advantages of the present invention will become apparent from the following detailed description when considered with the drawing in which.

Figures 1, 3:
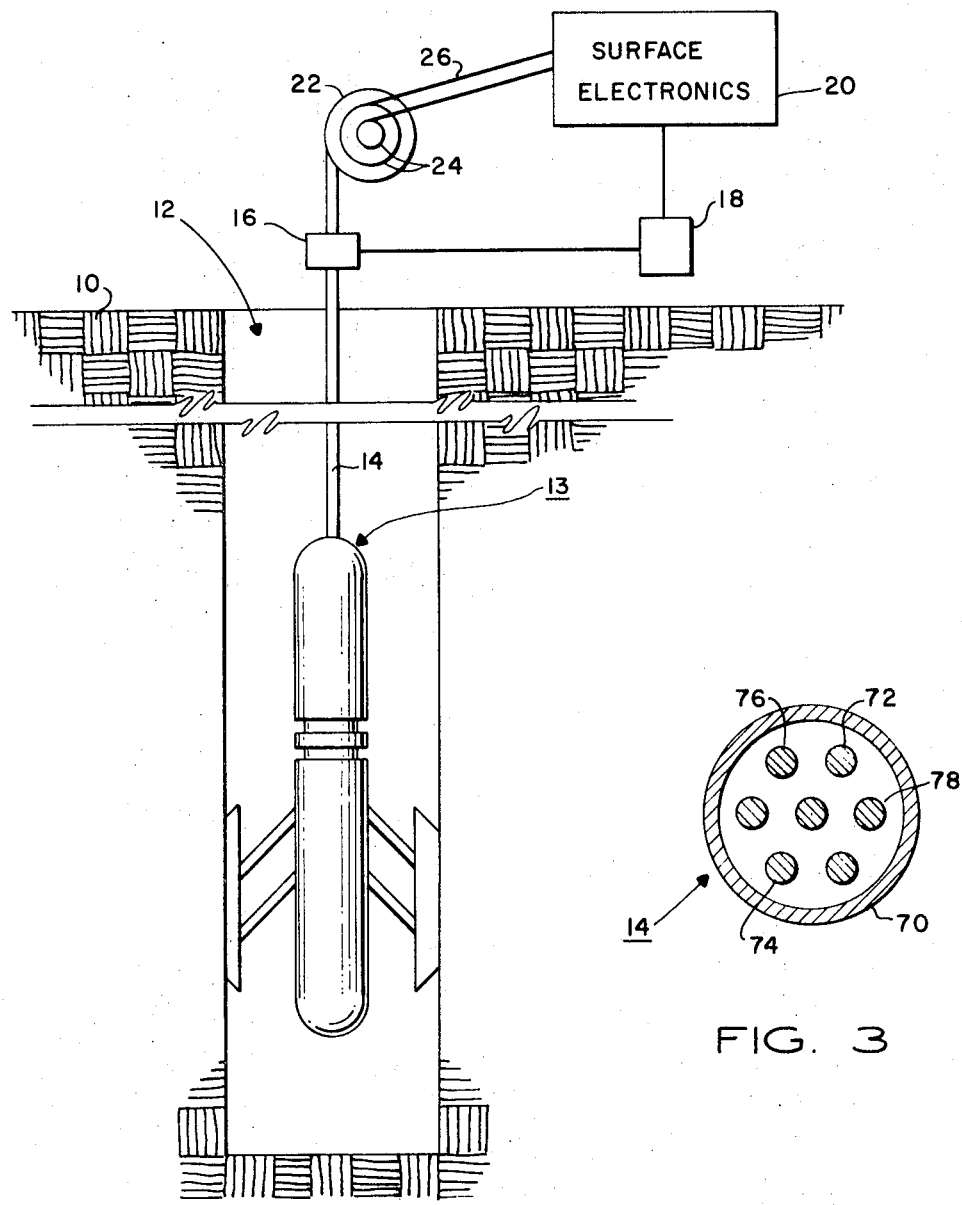
FIG. 1 is a schematic illustration of a well-logging operation showing the logging instrument supported in a borehole from the surface equipment.
FIG. 3 illustrates in cross section the logging cable used with the invention.

Referring now to the drawing in more detail, FIG. 1 illustrates a portion of the earth's surface 10 into which a borehole 12 has been drilled. Disposed within the borehole and adapted to be raised and lowered therein is a borehole instrument 13 supported by a cable 14 from the earth's surface. The apparatus on the surface of the earth consists of a measuring wheel 16 over which the cable 14 passes and a drum 22 on which the cable is wound, or from which it is unwound, when the instrument 13 is caused to traverse the borehole 12. The conductors 26 are connected to the conductors within the cable 14 by means of the sliprings 24 and brushes (not illustrated) carried on one end of the drum 22. The conductors 26 lead into the surface electronics section 20. As should be appreciated from a further reading of the detailed description according to the invention, the surface electronics 20 includes the necessary conventional amplifying and recording equipment for recording a pair of signals from the subsurface instrument 13 which has been transmitted over the cable 14. Such a recorder might, for example, have a pair of recording heads for the two focused section signals. The measuring wheel 16 is also connected to drive the transmission means 18 which causes the recorder (not illustrated) within the surface electronics 20 to record the subsurface measurements as a function of depth within the borehole in the conventional manner.

Figure 2:
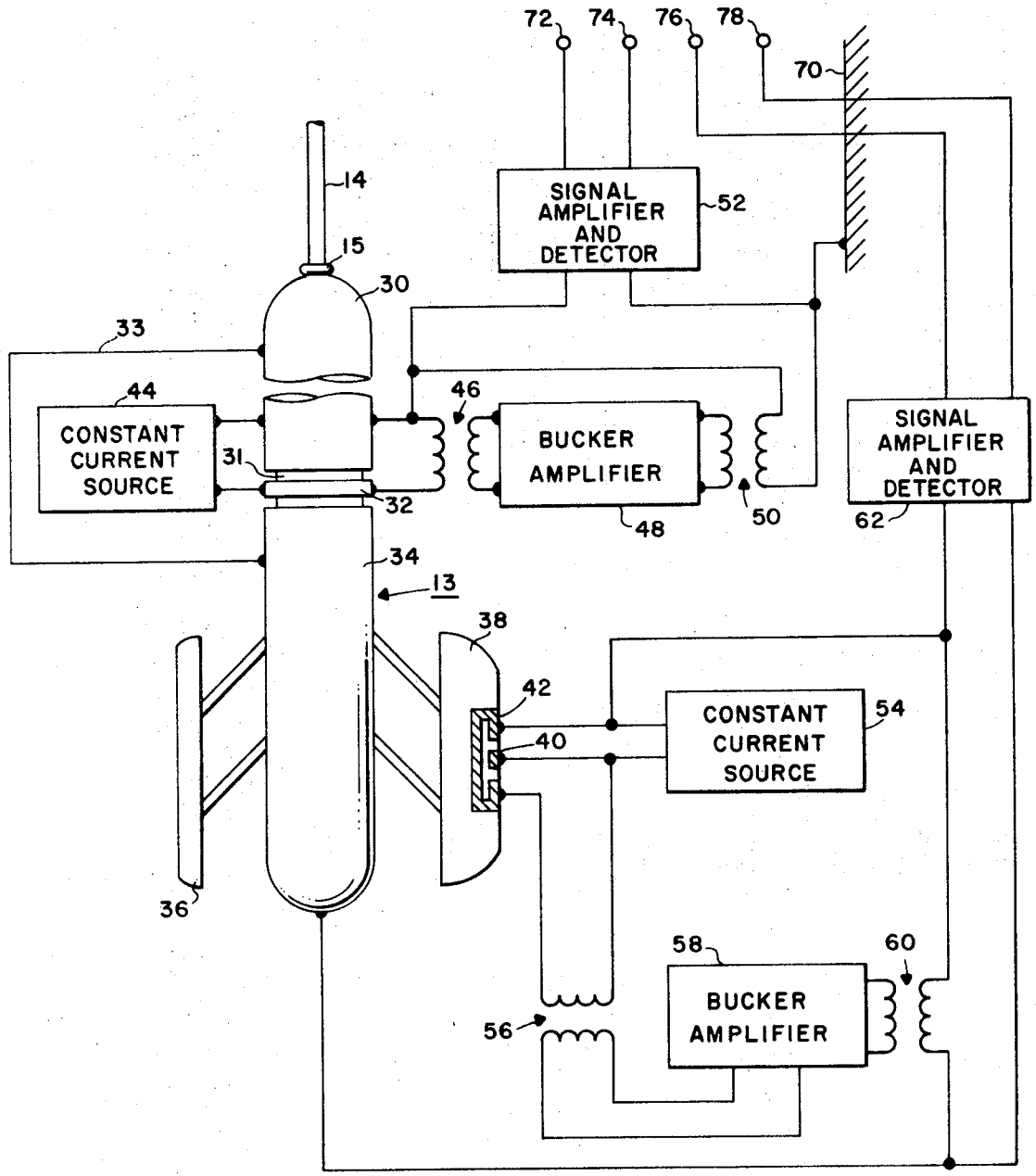
FIG. 2 illustrates schematically a borehole instrument according to the invention.

Referring now to FIG. 2, there is illustrated schematically the borehole instrument 13 according to the invention and the electronics (partly in block diagram) found therein. The supporting cable 14, being armor-plated to provide a remote electrode as is explained hereinafter, is coupled into the top section of the instrument 13 through an insulator 15 so that the armorplate of the cable 14 will not necessarily be maintained at the same electrical potential as that of the upper guard electrode 30 of the borehole instrument. The upper guard electrode 30 is approximately 7 feet 2 inches in length. Immediately beneath the upper guard electrode 30 is an insulator section 31, for example, comprised of ceramic, and then a center electrode 32. The center electrode 32 is approximately 6 inches in height. Although different heights can be used for the center electrode, it has been shown that with such dimensions, approximately 75 percent of the resistivity measurement covers a diameter of 12 feet around the borehole. Likewise, 90 percent covers a diameter of 26 feet.

A lower guard section 34 forms the bottom portion of the instrument 13 and is separated from the center electrode 32 by a similar insulator as insulator 31 which separates the center electrode from the upper guard section 30. The upper guard section 30 is maintained at the same electrical potential as that of the lower guard section 34, for example, as by the conductor 33.

It should be appreciated that while the insulator sections 31 which separate the upper guard 30 from the center electrode 32 and the center electrode 32 from the lower guard section 34 are shown, for ease of illustration, as being recessed from the periphery of the instrument 13, such a recess forms no part of this invention and the sides of the insulators can coincide, or even extend from, the sides of the instrument 13 if desired.

A constant current source 44 is connected to the center electrode 32. Although the constant current source could provide either an AC or DC current to the center electrode 32, a preferred embodiment of the invention contemplates that a low frequency alternating current is applied to the center electrode. Also connected between the center electrode 32 and the upper guard electrode 30 is an error transformer 46 which continuously monitors and senses any potential difference between the center electrode 32 and the guard electrodes 30 and 34. Any difference in potential is amplified by the bucker amplifier 48 and coupled through the transformer 50 to supply a signal back to the guard electrodes 30 and 34, thus maintaining the guard electrodes at substantially the same electrical potential as the center electrode 32. Also connected to the guard electrode 30 is a signal amplifier and detector section 52 which provides an indication of the electrical potential of the guard electrode 30 with respect to the armorplate 70 of the cable 14. The DC voltage output of the signal amplifier and detector section 52 is coupled through the cable 14 by conductors 72 and 74 for transmission to the earth's surface.

In the operation of the focused logging section thus far described, the electrical potential on each of the upper and lower guard sections, being sections 30 and 34, respectively, is maintained at substantially the same as that of the center electrode 32. With such a configuration, the constant current source 44 causes the center electrode 32 to pass or emit a current beam approximately 6 inches in height about 11 feet or more into the adjacent earth formations. Some distance further into the formations, the current beam swings upward into the armor-plated shield 70 of the cable 14 and the resistivity of the formation causes there to be a difference in the electrical potential between the guard electrode 30 and the remote point 70 on the cable 14.

The lower guard section 34 of the instrument 13 is approximately 7 feet 3 inches in length. A borehole wall-engaging pad member 38 is mechanically connected with the guard electrode 34. Also connected to the lower guard member 34 is a backup shoe 36 which engages another side of the borehole wall, thus causing the pad member 38 to continuously contact the borehole wall while the instrument 13 traverses the borehole. It should be appreciated that the backup shoe 36 and the pad member 38 can be supported from the guard member 34 by spring members, hydraulic members or by any other means known in the art for causing each of them to engage the borehole wall.

The pad member 38, being fabricated for the most part from an insulating material, for example, of hard rubber, contains one center button-type electrode 40 around which are one or more guard electrodes 42. A constant current source 54 causes a focused beam of current to be passed or emitted from the center electrode 40 having a beam height of approximately 1 inch with a depth of investigation of approximately 3½ inches. Through the use of the error-sensing transformer 56, the bucking current amplifier 58 and transformer 60, the electrical potential on the guard ring 42 is maintained substantially the same as that on the center electrode 40, in an analogous manner as that described above with respect to the other focused section. The guard electrode 42 is also connected to the signal amplifier and detector section 62 which measures the electrical potential between the lower guard electrode 34 and the guard ring 42 of the minifocused pad device. The conductors 76 and 78 are coupled out of the signal amplifier and detector section 62 through the cable 14 for transmission of the DC signals to the earth's surface.

FIG. 3 illustrates a typical seven-conductor logging cable having an armor-plated shield 70 which is particularly useful for carrying out the preferred embodiment of the invention. As illustrated in FIG. 3, the DC signals from the signal amplifier detector section 52 are coupled through the conductors 72 and 74, whereas the DC signals from the signal amplifier and detector section 62 are coupled through the conductors 76 and 78, the signals on conductors 76 and 78 being indicative of the electrical potential detected by the minifocused (shallow investigation) section, and the signals on the conductors 72 and 74 being indicative of the electrical potential detected by the focused (deep investigation) section.

Thus, it should be appreciated that there has been illustrated and described herein a method and apparatus whereby the use of one of the guard electrodes in one of the focused sections as the remote electrode in the other focused section allows simultaneous investigations of the shallow and deep resistivities of the formations surrounding a borehole. Although the preferred embodiment of the invention contemplates that one of the focused sections have a deeper field of investigation than that of the other section, it should be appreciated by those skilled in the art that an alternative embodiment of the invention would provide for two similar focused resistivity sections, yet maintaining the guard electrode of one of the sections as the remote electrode of the other focused section.

Although not illustrated, it should likewise be appreciated that a potentiometer could be connected to either the backup shoe or the pad section of the instrument 13 and the caliper signals could be transmitted over the same logging cable to provide an indication of changes, if any, in the borehole diameter. It should further be appreciated that, although not illustrated, additional logging sections can be incorporated within the borehole instrument 13, for example, a gamma ray instrument, and the signals therefrom could be sent up the same logging cable 14. Although the preferred embodiment of the invention has been illustrated and described herein, other modifications of the invention will occur to those skilled in the art and it is contemplated that such modifications and alterations as come within the spirit of the invention are to be covered by the appended claims.

I claim:
1. A logging apparatus for measuring characteristics of earth formations surrounding a borehole, comprising:
   an elongated instrument adapted to traverse an earth borehole;
   means for passing a first electrical current from a first electrode mounted on said instrument through said formations to a remote point;
   first guard means mounted on said instrument for causing said first current to travel substantially laterally from said first electrode before traveling to said remote point;
   means for passing a second electrical current from a second electrode connected to said instrument through said formations to said first guard means;
   second guard means connected to said instrument for causing said second current to travel substantially laterally from said second electrode before traveling to said first guard means; and means for providing indications of the electrical potential between said first guard means and said remote point and between said first and second guard means, said electrical potential related to the characteristics of earth formations surrounding the borehole.

2. A logging apparatus according to claim 1 comprising in addition thereto an armor-plated cable for supporting said instrument during traversal of the borehole and for permitting transmission of said indications of electrical potential to the earth's surface.

3. A logging apparatus according to claim 2 wherein said remote point comprises the armor on said cable.

4. A logging apparatus for measuring characteristics of earth formations surrounding a borehole, comprising:
an elongated instrument adapted to traverse an earth borehole;
a first electrode mounted on said instrument;
a first electric current source connected to said first electrode for passing current from said first electrode through the formations surrounding the borehole to a first point remote from said first electrode;
a first pair of guard electrodes on opposite sides of said first electrode, each of said first pair of guard electrodes having the same electrical potential;
means for maintaining the same electrical potential on said pair of guard electrodes as is on said first electrode;
a pad member on said instrument arranged to be held in contact with the borehole wall during traversal by said instrument;
a second electrode mounted on said pad;
a second electric current source connected to said second electrode for passing current from said second electrode through the formations surrounding the borehole to a second point remote from said second electrode;
a third guard electrode mounted around said second electrode;
means for maintaining the same electrical potential on said third guard electrode as is on said second electrode;
means for providing indications of the electrical potential between said first pair of guard electrodes and said first remote point, said electrical potential related to the characteristics of earth formations surrounding the borehole; and
means for providing indications of the electrical potential between said third guard electrode and said second remote point wherein said second remote point comprises one of said first pair of guard electrodes and said electrical potential is related to the characteristics of earth formations surrounding the borehole.

5. A logging apparatus according to claim 4 comprising in addition thereto an armor-plated cable for supporting said instrument during traversal of the borehole and for permitting transmission of said indications of electrical potential to the earth's surface.

6. A logging apparatus according to claim 5 wherein said first remote point comprises the armor on said cable.

7. In a method for simultaneously investigating the deep and shallow electrical resistivities of earth formations traversed by a borehole, the steps of
passing a first focused electrical current having a given lateral movement into the formations from a first electrode to a first point remote from said first electrode;
passing a second focused electrical current having a lateral movement into the formations reduced from said given lateral movement from a second electrode to a second point remote from said second electrode;
measuring the deep electrical resistivity of the formations as a function of the electrical potential between said first electrode and said first remote point; and
measuring the shallow electrical resistivity of the formations as a function of the electrical potential between said first and second electrodes.

8. The method according to claim 7 wherein each of the steps are repeated at different depths in the borehole.

9. In a method for simultaneously investigating the electrical resistivities of earth formations traversed by a borehole with a pair of focused electrical resistivity sections in the same borehole instrument, the steps of
passing a first focused electrical current into the formations from a first electrode to a first point remote from said first electrode;
passing a second focused electrical current into the formations from a second electrode to a second point remote from said second electrode, said second remote point having the same electrical potential as the potential of said first electrode;
providing an indication of the electrical potential between said first electrode and said first remote point, said electrical potential related to the characteristics of earth formations traversed by the borehole; and
providing an indication of the electrical potential between said second electrode and said second remote point, said electrical potential related to the characteristics of earth formations traversed by the borehole.